US008650080B2

(12) United States Patent
O'Connell et al.

(10) Patent No.: US 8,650,080 B2
(45) Date of Patent: Feb. 11, 2014

(54) USER-BROWSER INTERACTION-BASED FRAUD DETECTION SYSTEM

(75) Inventors: Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2303 days.

(21) Appl. No.: 11/279,202

(22) Filed: Apr. 10, 2006

(65) Prior Publication Data

US 2007/0239604 A1    Oct. 11, 2007

(51) Int. Cl.
*G06Q 30/00* (2012.01)
(52) U.S. Cl.
USPC .......................... 705/14.47; 705/14.4; 705/64
(58) Field of Classification Search
USPC ........................................ 705/14.4, 14.47, 64
See application file for complete search history.

(56) References Cited

U.S. PATENT DOCUMENTS

| | | | |
|---|---|---|---|
| 6,304,915 | B1 | 10/2001 | Nguyen et al. |
| 6,668,327 | B1 | 12/2003 | Prabandham et al. |
| 2001/0042045 | A1 | 11/2001 | Howard et al. |
| 2002/0178257 | A1 | 11/2002 | Cerrato |
| 2004/0015714 | A1 | 1/2004 | Abraham et al. |
| 2004/0250115 | A1 | 12/2004 | Gemmel et al. |
| 2005/0008148 | A1 | 1/2005 | Jacobson |
| 2005/0050366 | A1 | 3/2005 | Kwok et al. |
| 2005/0154676 | A1* | 7/2005 | Ronning et al. .............. 705/44 |
| 2006/0282660 | A1 | 12/2006 | Varghese et al. |
| 2007/0073579 | A1* | 3/2007 | Immorlica et al. ............ 705/14 |
| 2007/0239604 | A1 | 10/2007 | O'Connell et al. |

FOREIGN PATENT DOCUMENTS

| | | |
|---|---|---|
| WO | 02082214 A2 | 10/2002 |
| WO | 02082214 A3 | 10/2002 |
| WO | WO02082214 A2 | 10/2002 |

OTHER PUBLICATIONS

Sergio Tenreiro de Magalhaes, Kenneth Revett and Henrique M.D. Santos, Password Secured Sites-Stepping Forward with Keystrokes Dynamics, Aug. 22-26, 2005, IEEE Computer Society, pp. 1-6.
globalsecurity.org, "Biometrics: Hand Geometry and Handwriting," http://www.globalsecurity.org/security/systems/hand.htm, Apr. 27, 2005, pp. 3.
Tsan-Yu J. Huang, Final Office Action; mail date Jul. 7, 2009; published by the USPTO in utility U.S. Appl. No. 11/279,202, pp. 15.

(Continued)

*Primary Examiner* — Tsan-Yu J Huang
(74) *Attorney, Agent, or Firm* — Patents on Demand P.A.; Brian K. Buchheit; Scott M. Garrett

(57) ABSTRACT

Systems, methods and media for detecting fraudulent behavior during an Internet commerce session are disclosed. Embodiments of a method may include establishing an e-commerce session with a user and requesting fraud detection analysis of user-browser interaction during the e-commerce session. Embodiments may also include receiving fraud detection results for the e-commerce session, where the fraud detection results may provide an indication of a comparison between the user's interaction with a browser during the e-commerce session and known fraudulent behavior. Embodiments may also include performing an action based on the fraud detection results. Determining the fraud detection results may include determining user-browser interaction data associated with the session and comparing the user-browser interaction data to known fraudulent human or automated program behavior. Performing the action based on fraud detection results may include one or more of completing an e-commerce transaction, requesting additional authentication, denying the requested action, etc.

3 Claims, 7 Drawing Sheets

(56) References Cited

OTHER PUBLICATIONS

Tsan-Yu J. Huang, Non-Final Office Action; mail date Jul. 23, 2009; published by the USPTO in utility U.S. Appl. No. 11/279,202, pp. 14.
Yanet Rodriguez, Non-Final Office Action; mail date Apr. 14, 2009; published by the USPTO in utility U.S. Appl. No. 11/279,186, pp. 21.
S.J.Shepherd, "Continuous Authentication by Analysis of Keyboard Typing Characteristics," European Convention of Security & Detection, May 16-18, 1995, Conference Pub No. 408 copyright IEE 1995, pp. 111-114.
International Search Report; International App No. PCT/EP2007/051950, mail date: Nov. 7, 2007; pp. 2.
Yanet Rodriguez, U.S. Appl. No. 11/279,186.
Tsan-Yu J-Huang, U.S. Appl. No. 11/279,202.

* cited by examiner

USER-BROWSER INTERACTION-BASED FRAUD DETECTION SYSTEM

FIELD OF INVENTION

The present invention is in the field of data processing systems and, in particular, to systems, methods and media for detecting fraudulent behavior based on analysis of user-browser interaction, such as during an Internet or e-commerce session.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM or DVD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. The use of mobile computing devices, such as notebook PCs, personal digital assistants (PDAs), sophisticated wireless phones, etc., has also become widespread. Mobile computing devices typically exchange some functionality or performance when compared to traditional PCs in exchange for smaller size, portable power, and mobility.

The widespread use of PCs and mobile computing devices in various segments of society has resulted in a reliance on computer systems both at work and at home, such as for telecommuting, news, stock market information and trading, banking, shopping, shipping, communication in the form of hypertext transfer protocol (http) and e-mail, as well as other services. Many of these functions take advantage of the communication abilities offered by the Internet or other networks, such as local area networks. One function that continues to grow in importance is Internet-based commerce (also known as e-commerce or on-line commerce) where consumers purchase goods or services from businesses via an Internet connection. Typically, a consumer may utilize a browser or other interface on their PC or other device to select a product or service for purchase from a website (i.e., e-commerce site) operated by the business. While Internet commerce continues to dramatically rise in importance to both businesses and consumers, fraudulent behavior slows adoption of Internet commerce and costs both businesses and consumers time, money, and other resources. Hackers conduct Internet fraud by hijacking accounts (i.e., stealing account information) and performing tasks with the stolen account information, improperly acquiring goods, services, or money. Hackers can hijack accounts by many methods, including "phishing" (fraudulently acquiring account information by pretending to be a trustworthy source), spyware, insider information, compromised data sources at the commerce location, or other methodologies. Automated programs also exist that try to replicate the actions of users for fraudulent or other improper purposes.

Many solutions have been developed to detect and combat Internet commerce fraud by businesses, browser developers, and others, but all have failed to provide an effective and efficient solution. One solution is to require authentication is to require a user id and password to complete a transaction, but such authentication by itself is subject to hijacking by the means described previously. One known solution is to require a security code (a three or four digit non-imprinted number on a credit card) with every on-line purchase in addition to password authentication, but this solution provides no protection for phishing as the code will typically be entered during the phishing process along with other account information. Another solution is to also require operator 'call back' to authenticate the purchaser, but phone numbers can be quickly setup and taken down with no audit trail with Voice over Internet Protocol (VOIP) accounts, especially if a VoIP account is hijacked. Moreover, this solution significantly increases the expense to businesses as it requires a live person to make phone calls. Customer satisfaction is also reduced with this solution as the customer must be near a phone to receive a call back and, for purchased goods, is not treated to the instant satisfaction of their purchase.

Automated programs present additional challenges of authentication and for Internet commerce fraud. In addition to the previous solutions, one solution to prevent automated programs from improperly interacting with websites is to use CAPTCHA ("Complete Automated Public Turing test to tell Computers and Humans Apart") technology which presents users with an image of distorted, obscured letters and requires them to type those letters before they are allowed to continue. Because the text is obscured, it prevents simple character recognition programs from decoding the image into letters and prevents automated programs from proceeding. However, advanced algorithms can now defeat CAPTCHA systems in the vast majority of cases (some reports indicate that the system can now be defeated 90% of the time or more). There is, therefore, a need for an efficient and effective system to detect fraud by either humans or automated programs during Internet commerce sessions.

SUMMARY OF THE INVENTION

The problems identified above are in large part addressed by systems, methods and media for detecting fraudulent behavior during an Internet commerce session. Embodiments may include establishing an e-commerce session with a user and requesting fraud detection analysis of user-browser interaction during the e-commerce session. Embodiments may also include receiving fraud detection results for the e-commerce session, where the fraud detection results may provide an indication of a comparison between the user's interaction with a browser during the e-commerce session and known fraudulent behavior. Embodiments may also include performing an action based on the fraud detection results. Further embodiments may include authenticating the user with a first-level authentication or, before requesting fraud detection analysis, determining that fraud detection analysis is desired based on received inputs from the user. In a further embodiment, determining the fraud detection results may include determining user-browser interaction data associated with the e-commerce session and comparing the user-browser interaction data to known fraudulent human behavior or known fraudulent automated program behavior. In a further embodiment, performing the action based on fraud detection results may include one or more of completing an e-commerce transaction, providing restricted information, modifying user information, changing a password for the user, providing additional information, requesting additional authentication, or denying the requested action.

Another embodiment provides a machine-accessible medium containing instructions effective, when executing in a data processing system, to cause the system to perform a series of operations for detecting fraudulent behavior during an Internet commerce session. The series of operations generally includes establishing an e-commerce session with a user and requesting fraud detection analysis of user-browser interaction during the e-commerce session. The series of operations may also include receiving fraud detection results for the e-commerce session, where the fraud detection results may provide an indication of a comparison between the user's interaction with a browser during the e-commerce session and known fraudulent behavior. The series of operations may also include performing an action based on the fraud detection results.

A further embodiment provides an e-commerce fraud detection system having an application server in communication with an incoming interaction server and a fraud detection server. The application server may include an e-commerce application to establish a session with a user of a client computer system. The application server may also include a fraud detection requester to request fraud detection analysis of user-browser interaction for the established session and to receive fraud detection results for the established session. The e-commerce application may perform an action based on the fraud detection results for the established session. The system may also include an incoming interaction server having a session data listener to receive user-browser interaction data from one or more client computer systems, an interaction data manager to associate received user-browser interaction data with a user login, and an interaction database interface to store the user-browser interaction and associated information in a user-browser interaction database. The system may also include a fraud detection server having an application server interface to receive a request for fraud detection analysis of user-browser interaction and to transmit determined fraud detection results to the application server, an interaction database interface to access stored user-browser interaction data, and a fraud detection module to analyze the stored user-browser interaction data associated with the established session by comparing the user-browser interaction data with known fraudulent behavior to determine fraud detection results.

Another embodiment provides a method for detecting fraudulent behavior for an e-commerce session. Embodiments may include determining user-browser interaction data associated with a current e-commerce session and analyzing the determined user-browser interaction data by comparing the data with known fraudulent behaviors. Embodiments may also include generating fraud detection results for the current e-commerce session based on the analysis of the determined user-browser interaction data. Further embodiments may include, before determining the user-browser interaction data associated with the current session, receiving a request to analyze user-browser interaction data for fraudulent behavior. Further embodiments may also include transmitting the determined fraud detection results.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

Figure 1:
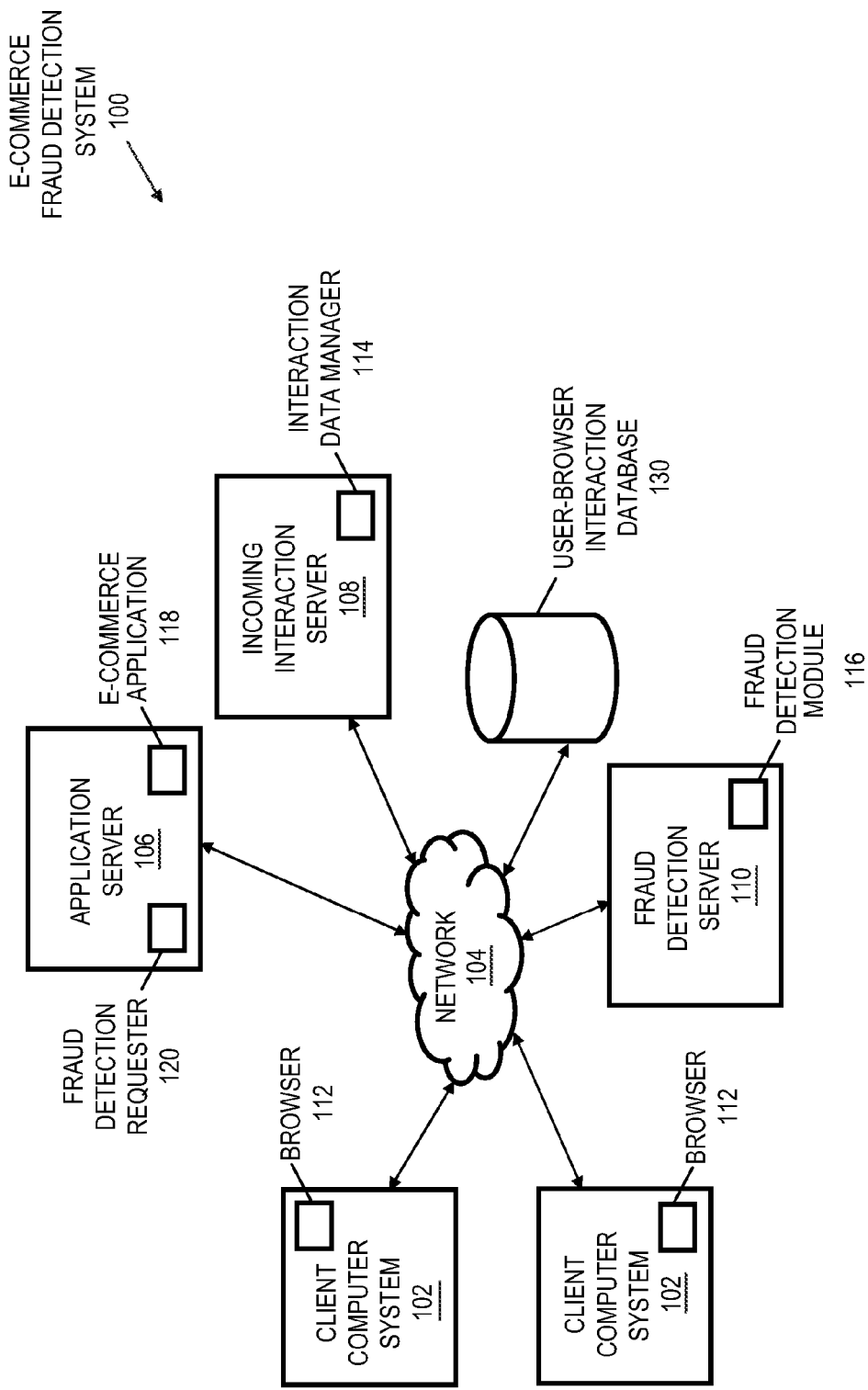
FIG. 1 depicts an environment for an e-commerce fraud detection system with an application server, incoming interaction server, and fraud detection server according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for detecting fraudulent behavior during an Internet commerce session are disclosed. Embodiments of a method may include establishing an e-commerce session with a user and requesting fraud detection analysis of user-browser interaction during the e-commerce session. Embodiments may also include receiving fraud detection results for the e-commerce session, where the fraud detection results may provide an indication of a comparison between the user's interaction with a browser during the e-commerce session and known fraudulent behavior. Embodiments may also include performing an action based on the fraud detection results. In a further embodiment, determining the fraud detection results may include determining user-browser interaction data associated with the e-commerce session and comparing the user-browser interaction data to known fraudulent human or automated program behavior. Performing the action based on fraud detection results may include one or more of completing an e-commerce transaction, providing restricted information, modifying user information, changing a password for the user, providing additional information, requesting additional authentication, or denying the requested action.

The system and methodology of the disclosed embodiments allows for unobtrusive detection of fraudulent behavior by a purported user during an e-commerce (Internet) session or transaction by comparing the user's interaction with their browser with known fraudulent behavior of either humans or automated programs. The user's interaction may include attributes such as the speed of selecting keys, the method the user utilizes to move between fields (e.g., mouse, tab key, etc.), how quickly the pointer is moving or if it is moving at all, whether the browser window loses and regains focus, or any other aspect of the user's browser interaction. A user who has stolen credit card or other personal information may, for example, more typically paste content in fields instead of typing in the content or may have long pauses at inappropriate times (e.g., when entering mother's maiden name). When the actions of a user are compared to known human fraudulent behavior factors, potentially fraudulent transactions may be identified and stopped before completion of a transaction. Similarly, behavior indicative of an automated program attempting to improperly enter data may include data entry that is too rapid, a mouse pointer that does not move, etc. By detecting this suspicious behavior and notifying an e-commerce application interacting with the user, the fraudulent actions of an automated program may also be prevented or minimized. The disclosed system and methodology may advantageously be unobtrusive to the consumer, who need not know that user-browser interaction data is being collected and analyzed for fraud detection purposes. The disclosed system and methodology may accordingly provide an effective and efficient fraud detection mechanism for fraudulent human and/or automated program behaviors.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Each software program described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present invention, represent embodiments of the present invention.

Turning now to the drawings, FIG. 1 depicts an environment for an e-commerce fraud detection system with an application server, incoming interaction server, and fraud detection server according to one embodiment. In the depicted embodiment, the e-commerce fraud detection system 100 includes a plurality of client computer systems 102 in communication with a network 104. The disclosed e-commerce fraud detection system 100 also includes an application server 106, an incoming interaction server 108, and a fraud detection server 110 all in communication with network 104. Users may utilize a browser 112 executing on a client computer system 102 to interact with an e-commerce application 118 of an application server 106 via network 104 by establishing a session with the e-commerce application 118. The incoming interaction server 108 may receive indications of the interaction between the user and browser 112 for storage in a user-browser interaction database 130 during operation of the browser 112 by the user. If the e-commerce application 118 determines that fraud detection analysis for a user session is desired, the application server 106 may request fraud detection results from the fraud detection server 110. The fraud detection server 110 may then determine fraud detection results based on the user-browser interaction during the current session and known fraudulent behavioral patterns and return the fraud detection results to the user. Based on the fraud detection results and in response to a request by the user for an action, the e-commerce application 118 may perform an action such as allowing the requested transaction, requesting additional authentication information, or rejecting the requested action. The e-commerce application 118 may thus utilize the fraud detection results to detect suspicious or fraudulent behavior and help prevent fraudulent transactions from occurring.

Client computer systems 102 may each include one or more personal computers, workstations, servers, mainframe computers, notebook or laptop computers, desktop computers, PDAs, set-top boxes, mobile phones, wireless devices, or the like. In some embodiments, client computer system 102 may be a computer system as described in relation to FIG. 2 and may be in wired or wireless communication with network 104. Browser 112 may be a graphical browser application that allows a user to view Internet or intranet content such as Microsoft Corporation's Internet Explorer™, Netscape Communication Corporation's Navigator™, Mozilla Foundation's Mozilla, Apple Corporation's Safari™, etc. Browsers, at their most basic level of operation, permit users to connect to a given network site, download informational content from that site, and display that information to the user. To view additional information, the user designates a new network address (such as by selecting a link) whose contents then replace the previously displayed information on the user's computer display. Using a browser 112, a user may interact with an e-commerce application 118 to perform tasks such as purchasing goods or services, requesting or viewing information, providing information, or other tasks. A user may interact with the browser 112 via user input devices of the client computer system 102 such as a mouse, keyboard, voice input device, etc., as will be described in more detail subsequently.

As will be described in more detail subsequently, the client computer system 102 may transmit indications of the user's interaction with the browser 112 to the incoming interaction server 108 via network 104 to facilitate determination of fraud detection results. The user-browser interaction data transmitted by the client computer system 102 may include both indications of the user-browser interaction as well as identification information. In some embodiments, the browser 112 may be enabled with JavaScript™ (of Sun Microsystems, Inc.) or other code that enables transmission of interaction details from a client to a server. JavaScript™ is a system of programming codes that can be embedded in Hypertext Markup Language (HTML) language or other language of a page to provide additional functionality and is generally supported by modern browsers 112. In these embodiments, the client software may be included as JavaScript on every page sent by the application server 106. The JavaScript™ code may track details of the user's interaction with the browser 112 and transmit an indication of such interaction (as part of the user-browser interaction data) to the incoming interaction server 108. Using Asynchronous JavaScript And XML (AJAX) (also known as XMLHTTP), a Web development technique for creating interactive Web applications that is based on JavaScript™, user-browser interaction details may be transmitted in near-real-time to a specified server (i.e., the incoming interaction server 108). The browser 112 of the client computer system 102 will require compatibility with the scripting language used by e-commerce application 118. While the embodiments herein are described in relation to JavaScript™ and AJAX, one of ordinary skill in the art will recognize that other scripting languages or methodologies may also be utilized with the disclosed system.

The user-browser interaction data may include both indications of interactions between the user and browser 112 as well as identification information relating to the user and/or client computer system 102. User interactions with a browser 112 may be classified into general categories such as keyboard interactions, movement device interactions, and navigation/selection tendencies. Keyboard interactions may include interactions of a user with the keyboard, including key-down time (how long a particular key is pressed), typing rate, time or pauses between keystrokes, numeric keypad usage, capitalization keystroke sequences, common typing errors, etc. A particular user, for example, may typically hold down the 'o' key for milliseconds less time than she holds down the 'k' key, a pattern that may emerge consistently over continued data entry. This particular difference may reflect both hardware differences (e.g., the keyboard spring for each key on a particular keyboard) as well as the user's natural or learned typing pattern. A different user may have a larger gap between the two letters, a smaller gap, no gap, or a reversal of the longer hold time, providing a characteristic that potentially distinguishes the two users. While one such characteristic may generally be insufficient for authentication purposes, an aggregation of different behaviors provides increasing authentication strength as more data is collected and more factors are considered. Keyboard interactions may include the particular keys selected for tasks, the pauses in between actuations or the length of actuations, etc.

Other types of user-browser interaction are also possible. Movement device (e.g., mouse, trackball, etc.) interactions may include 'mouse-over' time before clicking, which buttons of a device are used, whether the scroll wheel is used, whether the user holds the cursor steady or fidgets with the cursor, whether the cursor moves, how quickly the cursor moves, whether the user follows the text with the cursor during reading, etc. Navigation and selection tendencies may include factors relating to how a user navigates a website or selects actions on a website, including scrolling methods (e.g., mouse wheel, arrow keys, left-click on up or down scroll buttons, page up/page down, etc.), whether the user uses 'hot keys' or selects actions from pull-down menus, error correction methods (e.g., highlighting text to be replaced with mouse or keyboard, using delete key, accepting spell-checker recommendations, etc.), where the user positions the cursor during screen loading, how the user navigates between fields (e.g., tab key, mouse, etc.), textbox submit preference (e.g., select 'enter' or use the mouse to select submit), indications of window toggling between entries, how long the user delays between different fields, the browser window losing and gaining focus (indicating selection of text from another window), etc. While a number of general categories and specific examples are described herein, one skilled in the art will recognize that any type of indication of the interaction of a user and a browser 112 and the site displayed on the browser 112 may be used. The details of a user's interaction while using a website using their browser 112 may, in some situations, provide an indication of fraudulent behavior by that user, as will be described in more detail subsequently.

Identification information included within the user-browser interaction data may include any information that serves to assist in identifying the user, browser 112, and/or client computer system 102, such as browser code name, browser major version, browser minor version, country code of the browser installation, CPU class, platform, IP address, user agent, system language and cookies.

Network 104 may be any type of data communications channel or combination of channels, such as the Internet, an intranet, a LAN, a WAN, an Ethernet network, a wireless network, a proprietary network, or a broadband cable network. The Internet or other public network may be particularly useful as network 104 when the client computer systems 102 are widely distributed from the application server 106 as communications between these systems will be facilitated. Similarly, a corporate intranet may serve as network 104 for communications with an internal corporate computing environment. Those skilled in the art will recognize, however, that the invention described herein may be implemented utilizing any type or combination of data communications channel(s).

Application server 106 may be a server computer dedicated to running particular software applications such as e-commerce applications 118, business applications, or databases. An application server 106 typically has built-in redundancy, high performance, and support for complex database access. Application server 106 may meet standards such as Java Platform, Enterprise Edition (Java EE™, formerly known as J2EE™) by Sun Microsystems, Inc. An example application server is International Business Machine's (IBM®'s) WebSphere® Application Server (WAS) that may serve as middleware to set up, operate, and integrate e-business applications across multiple computing platforms using Web technologies.

Application server 106 may include one or more e-commerce applications 118 and a fraud detection requester 120. An e-commerce application 118 (which may include one or more back-end applications, such as for inventory, billing, accounting, etc.) may be any application that may be used to provide services, content, or information to a user at a remote client computer system 102, including applications that facilitate purchase of goods or services by users or access to information by users. The fraud detection requester 120 may transmit requests to the fraud detection server 110 for fraud detection results for a current session via network 104 and may receive the determined fraud detection results from the fraud detection server 110. The fraud detection requester 120 may also, in conjunction with an e-commerce application 118, analyze the fraud detection results to determine an appropriate course of action in response to the results. The e-commerce application 118 may, for example, allow action by the user, deny actions by the user, mark any transaction for later follow-up, flag any transactions as ones that cannot complete until further verification, request additional authentication information, etc. The user request for an action during a session may include requesting completion of tasks such as an e-commerce transaction, accessing restricted information, modifying user information, changing a password for the user, or other action. The fraud detection requester 120 may be a separate module from e-commerce application 118 or may be integrated into an e-commerce application 118. A separate fraud detection requester 120 may potentially serve multiple e-commerce applications 118.

As described previously, the incoming interaction server 108 may receive indications of the interaction between the user and browser 112 for storage in a user-browser interaction database 130 during operation of the browser 112 by the user, providing for processing of user-browser interaction data. The application server 106 may include JavaScript™ or other script directing user-browser interaction information gathered at a client computer system 102 to be directed to a particular incoming interaction server 108. The incoming interaction server 108 may then store received user-browser interaction data in a user-browser interaction database 130. Before storing the user-browser interaction data, an interaction data manager 114 of the incoming interaction server 108 may associate the data with a particular user login for later access and analysis.

The fraud detection server 110 may determine fraud detection results based on the user's interaction with a browser 112 during the current session and known fraudulent behavior patterns. Upon receiving a request for fraud detection results for a particular user from an e-commerce application 118, the fraud detection server 110 may access the stored user-browser interaction data for that user and a fraud detection module 116 may analyze the stored data and compare the user-browser interaction data for the current session with known human or automated program fraudulent behavior. The user-browser interaction data for the current session may, in some embodiments, be stored in the user-browser interaction database 130. The fraud detection results may include an indication of the likelihood that the person (or entity) acting as the user of the current session is in fact the actual user or is actually a different user or automated program instead engaging in fraudulent behavior. The fraud detection results may be a final result (i.e., it is fraudulent behavior or it is not), a fraud detection score that provides an indication of the degree of likelihood of fraudulent behavior evidenced by the user, or any other representation of the results.

The fraud detection server 110 may transmit the determined fraud detection results to the requesting e-commerce application 118, which may in turn determine its course of action based at least in part on the fraud detection results. Different e-commerce applications 118 or functions within an e-commerce application 118 may have different tolerances for indicia of fraudulent behavior. A high value transaction, for example, might be denied based on less evidence of fraud than a lower value transaction. Once the e-commerce application 118 determines its course of action based on the fraud detection results, any requested actions of the user, and its own internal criteria, the e-commerce 118 may perform the selected action.

Application server 106, incoming interaction server 108, and fraud detection server 110 may each include one or more personal computers, workstations, servers, mainframe computers, notebook or laptop computers, desktop computers, or other computer systems. In some embodiments, any of the application server 106, incoming interaction server 108, and fraud detection server 110 may be a computer system as described in relation to FIG. 2 and each may be in wired or wireless communication with network 104. An example application server 106, incoming interaction server 108, and fraud detection server 110 may be an International Business Machine Corporation (IBM) eServer® server. In the e-commerce fraud detection system 100, the application server 106, incoming interaction server 108, and fraud detection server 110 may be located at the same location, such as in the same building or computer lab, or could be remote. While the term "remote" is used with reference to the distance between the components of the e-commerce fraud detection system 100, the term is used in the sense of indicating separation of some sort, rather than in the sense of indicating a large physical distance between the systems. For example, any of the components of the e-commerce fraud detection system 100 may be physically adjacent or located as part of the same computer system in some network arrangements.

The user-browser interaction database 130 may be any type of volatile or non-volatile storage and may store user-browser interaction data received by an incoming interaction server 108, as well as associated or identifying information. The user-browser interaction database 130 may be a stand-alone unit or be integrated into another component of the e-commerce fraud detection system 100 such as the incoming interaction server 108 or the fraud detection server 110.

The systems and methodologies of the disclosed embodiments provide an efficient and effective mechanism to detect fraudulent behavior during an e-commerce session. The disclosed system may operate without notification of the user in some embodiments to provide a seamless, unobtrusive and efficient fraud detection method. By tracking a user's interaction with a browser during a session, many types of fraudulent behavior by either humans or automated programs may be detected. By detecting fraudulent users before a transaction is complete, merchants or other e-commerce providers may potentially reduce losses to fraudulent transactions and other associated costs. While automated programs may be potentially devised to more closely replicate the actions of a real user and thus make detection more difficult, such solutions are likely to cause decreases in the efficiency and thus usefulness of such tactics. The disclosed system may be particularly useful for e-commerce applications where user convenience is highly valued and fraud is a significant risk.

Figure 2:
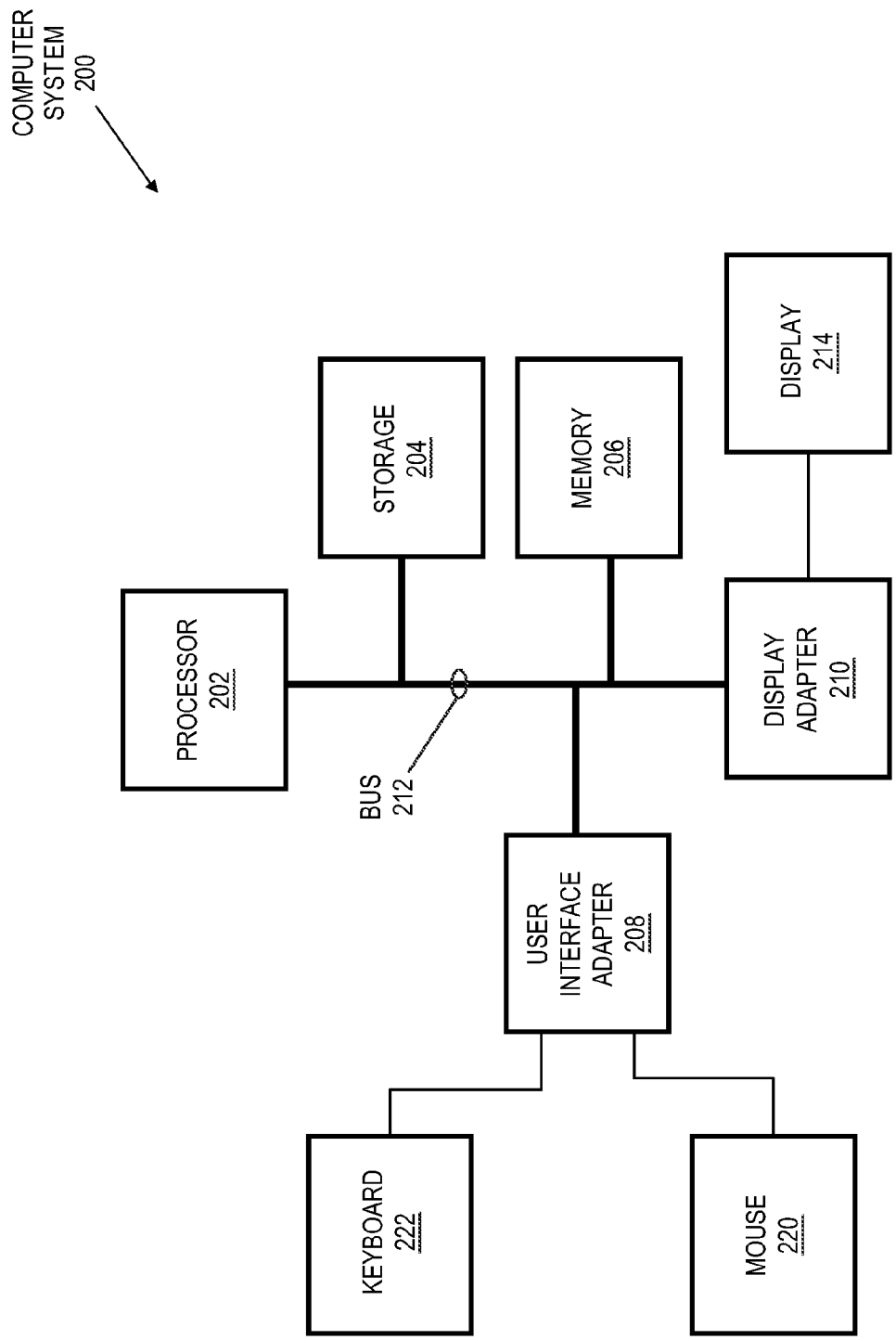
FIG. 2 depicts a block diagram of one embodiment of a computer system suitable for use as a component of the e-commerce fraud detection system.

FIG. 2 depicts a block diagram of one embodiment of a computer system 200 suitable for use as a component of the e-commerce fraud detection system 100, such as a client computer system 102, application server 106, incoming interaction server 108, or fraud detection server 110. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM).

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. For a client computer system 102, a user may utilize the keyboard 222 and mouse 220 to interact with a browser 112 and it is these interactions that may be used to create user-browser interaction data. The bus 212 may also connect the processor 202 to a display, such as an LCD display or CRT monitor, via the display adapter 210.

Figure 3:
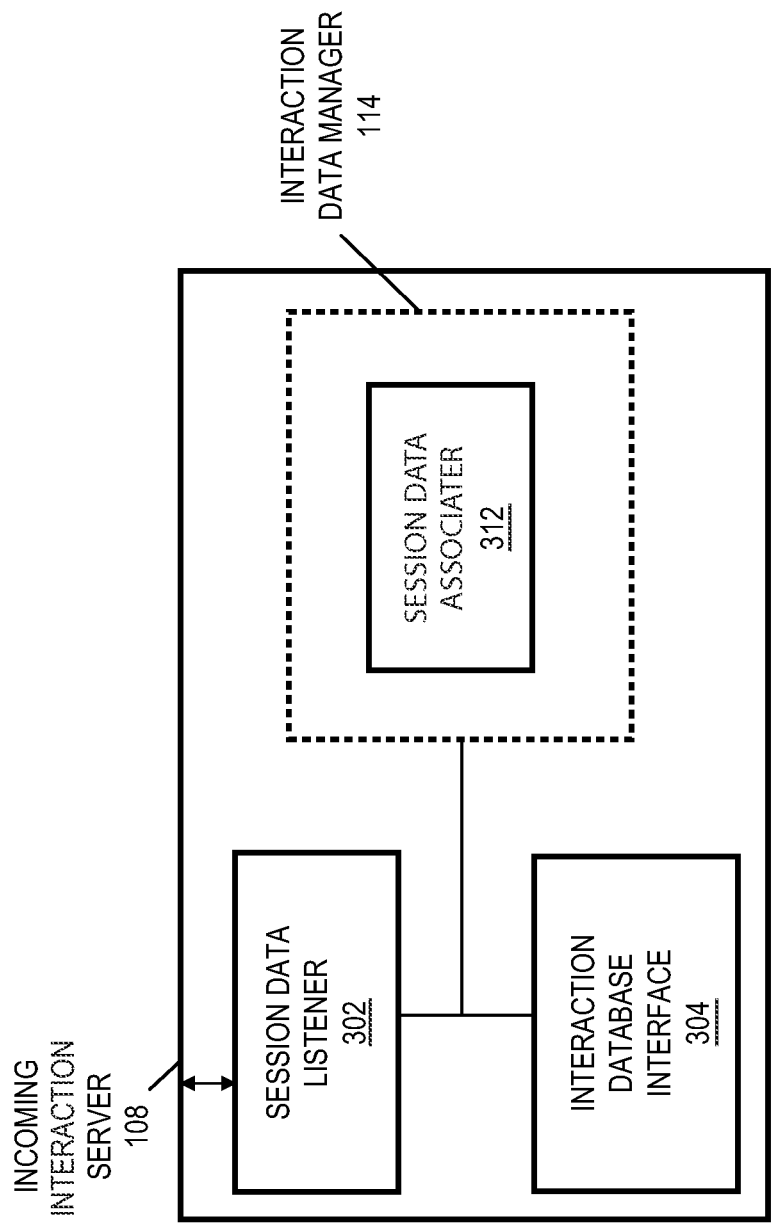
FIG. 3 depicts a conceptual illustration of software components of an incoming interaction server of the e-commerce fraud detection system according to one embodiment.

FIG. 3 depicts a conceptual illustration of software components of an incoming interaction server 108 of the e-commerce fraud detection system 100 according to one embodiment. As described previously (and in more detail in relation to FIG. 5), the incoming interaction server 108 may receive user-browser interaction data from one or more client computer systems 102 and process and store the received data. The incoming interaction server 108 of the depicted embodiment includes an interaction data manager 114, a session data listener 302, and an interaction database interface 304. The session data listener 302 may receive indications of user-browser interactions in the form of user-browser interaction data from client computer systems 102 via network 104. The session data listener 302 may then transmit received data for the interaction data manager 114 for processing. The interaction database interface 304 may store user-browser interaction data or other information in the user-browser interaction database 130 for the incoming interaction server 108 and may serve as the interface between the two components.

The interaction data manager 114 may process received user-browser interaction data and associate the data with a user, and may use sub-modules such as a session data associater 312 to assist it in performing its tasks. The session data associater 312 may associate received user-browser interaction data (from a particular session) with a particular user login. User names, logins, session identifiers, or other information may be contained as part of the user-browser interaction data in some embodiments so that the session data associater 312 may extract user login information from the received data.

Figure 4:
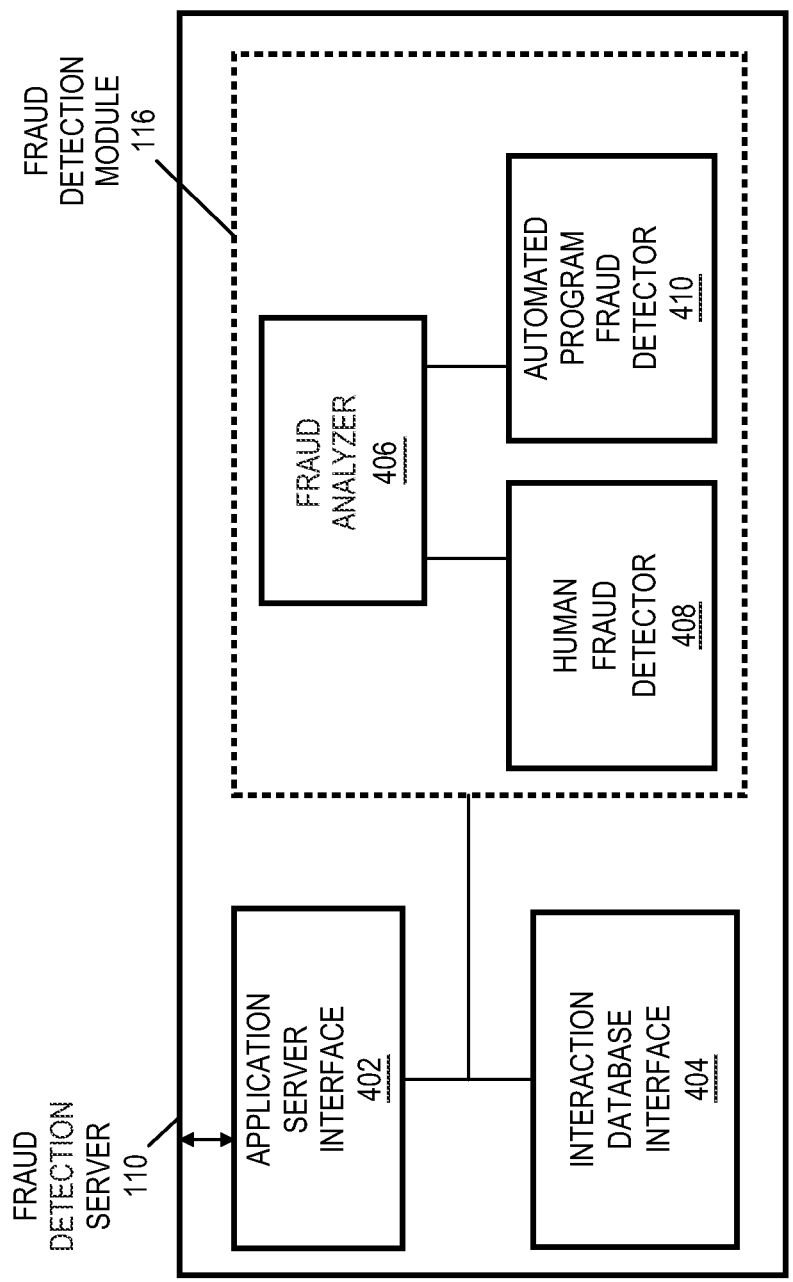
FIG. 4 depicts a conceptual illustration of software components of a fraud detection server of the e-commerce fraud detection system according to one embodiment.

FIG. 4 depicts a conceptual illustration of software components of a fraud detection server 110 of the e-commerce fraud detection system 100 according to one embodiment. As described previously (and in more detail in relation to FIG. 6), the fraud detection server 110 may determine fraud detection results based on the user's browser 112 interaction during the current session (which may be stored in the user-browser interaction database 130) and patterns or other indicia of known fraudulent behavior. The fraud detection server 110 of the depicted embodiment includes a fraud detection module 116, an application server interface 402, and an interaction database interface 404. The application server interface 402 may receive requests from an e-commerce application 118 for fraud detection results for a particular e-commerce session (such as one of its current sessions) and may pass those requests to the fraud detection module 116. The application server interface 402 may also receive determined fraud detection results from the fraud detection module 116 and may transmit the scores to the requesting e-commerce application 118. The interaction database interface 404 may, upon request by the fraud detection module 116, access user-browser interaction data or other information in the user-browser interaction database 130 and may serve as the interface between the two components.

The fraud detection module 116 may determine fraud detection results based on the user's browser 112 interaction during the current session (or any session for which the e-commerce application 118 requests analysis) and a comparison with known fraudulent behavior by humans and/or automated programs that are conducting fraudulent activities. The fraud detection module 116 may request the interaction database interface 404 to access user-browser interaction data for the e-commerce session that is stored in the user-browser interaction database 130 (based on the identify of the user, session identifier, or other information). The fraud detection module 116 may include sub-modules such as a fraud analyzer 406, human fraud detector 408, and automated program fraud detector 410 to assist it in performing its tasks. The fraud analyzer 406 may analyze stored user-browser interaction data for a particular user and e-commerce session, such as for interaction patterns of the user with their browser 112 (e.g., user tendencies, habits, etc.), and pass the results to either or both of the human fraud detector 408 and automated program fraud detector 410 for comparison with known fraudulent behavior. The fraud analyzer 406 may then, based on the results of its analysis comparisons performed by the human fraud detector 408 and/or automated program fraud detector 410, determine fraud detection results for the e-commerce session.

As discussed previously, the fraud detection results may include an indication of the likelihood that the person (or entity) acting as the user of the current session is in fact the actual user or is actually a different user or automated program instead engaging in fraudulent behavior. The algorithms used by the fraud detection module 116 and its sub-modules to determine the likelihood of fraudulent behavior may include both standard or general algorithms as well as algorithms specified by an implementer of the system (i.e., e-commerce application 118 operators) based on their own needs or observations of what is typical or fraudulent for their site. The flexibility of algorithms also includes whether to attempt to detect fraudulent behavior by both humans and automated programs or to only attempt to detect one of the two. The fraud detection result algorithms may thus allow for flexible weighting and/or consideration of different or multiple factors.

The human fraud detector 408 of the fraud detection module 116 may compare the user-browser interaction data with known fraudulent behavior indicative of a user who has stolen credit card or other type of data. Factors that may represent potential fraudulent behavior and thus raise potential security issues may include a jittery mouse pointer, long pauses between information that a typical user will not pause on (such as mother's maiden name, birthday, address, birth location, etc.), the browser window losing focus repeatedly between fields (which may be evidence of a user toggling between a victim or false persona and the browser), source IP address as indicator of ISP or country, time of day and day of week (especially relative to country), or other factors.

Another factor that may indicate potential fraudulent behavior is pauses between when the user clicks on a button or submits a form via a key command and when the form is actually sent, which may indicate a user intercepting and manipulating form data via a browser extension such as Tamperdata from the Mozdev.org software development community (available at http://tamperdata.mozdev.org/). One skilled in the art will recognize that other factors, whether known now or later developed, may also be used by the human fraud detector 408.

The automated program fraud detector 410 of the fraud detection module 116 may compare the user-browser interaction data with known fraudulent behavior indicative of an automatic program interacting with a website and attempting to fill out forms or perform other tasks. Factors that may represent potential fraudulent behavior by an automated program and thus raise potential security issues may include data that is entered too rapidly, a mouse pointer than never moves, a large form that is filled out without the browser window scrolling, data transmitted in a form without keystrokes being recorded, or other factors. One skilled in the art will recognize that other factors, whether known now or later developed, may also be used by the automated program fraud detector 410.

The automated program fraud detector 410 may often detect potential fraud without penalizing users who use form fillers legitimately as there is typically a noticeable difference between an automated program and a form filler based on tracking of the user's pointer. If the pointer goes off the webpage, the form data appears, and then the pointer comes back over the page, the user has likely just clicked a form filler tool. Similarly, if a key or keys are typed while the page has the focus and then the form data appears, the user has just engaged the form filler tool with a hotkey. In comparison, an automated program may typically have a mouse pointer that never moves. While an automated program could possibly be modified in order to make it appear as a human (such as by having it move the mouse pointer), this would slow down the automated program and make it less efficient (and thus useful).

Figure 5:
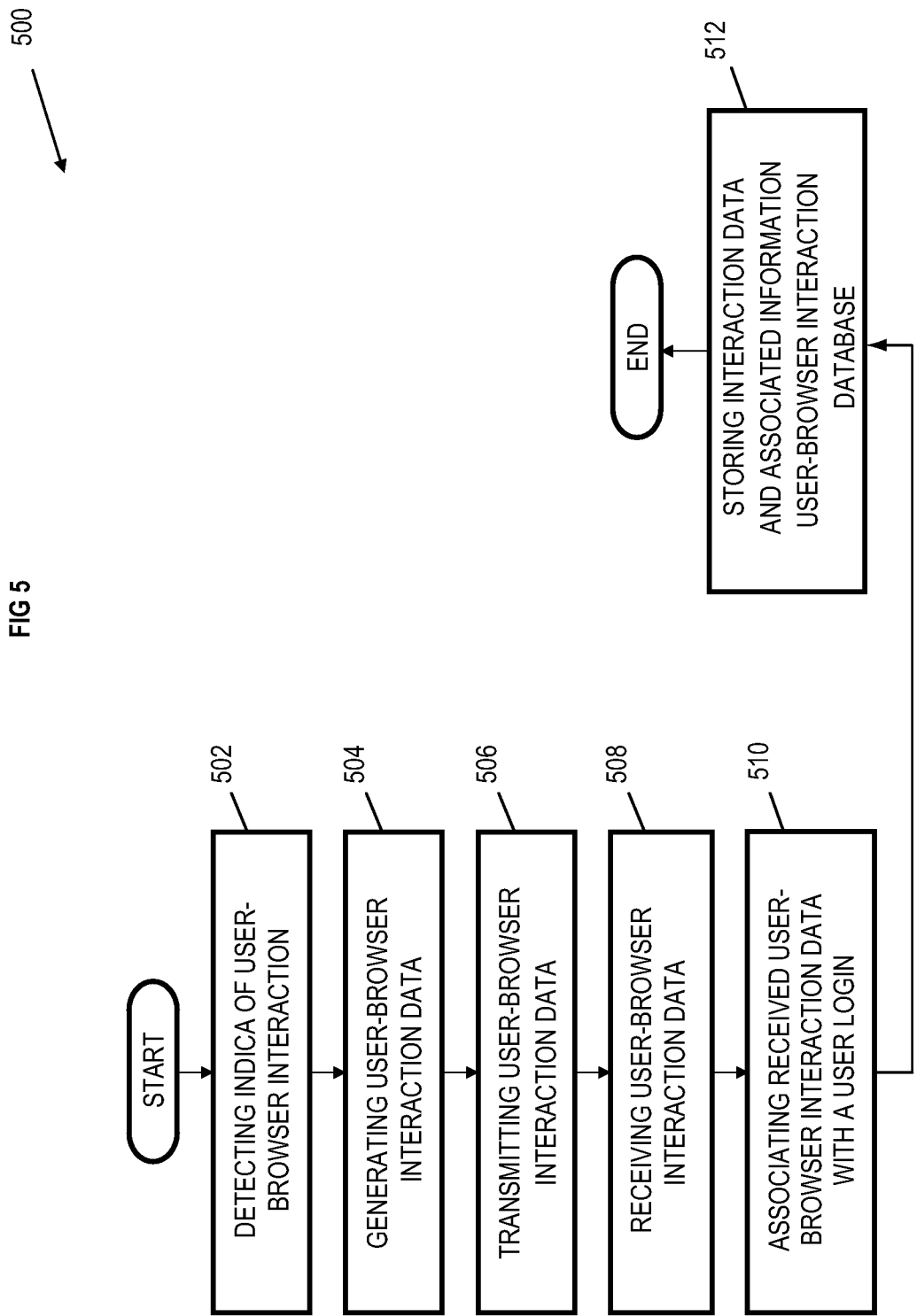
FIG. 5 depicts an example of a flow chart for detecting user-browser interactions and processing user-browser interaction data according to one embodiment.

FIG. 5 depicts an example of a flow chart 500 for detecting user-browser interactions and processing user-browser interaction data according to one embodiment. The method of flow chart 500 may be performed, in one embodiment, by a client computer system 102 and an incoming interaction server 108. Flow chart 500 begins with element 502, where the browser 112 of the client computer system 102 (such as script running on a displayed webpage) detects indicia of user-browser interaction. Element 502 (as well as elements 504 and 506) may execute in a browser 112 when the user accesses a webpage for an e-commerce application 118 that is configured for user-browser interaction-based authentication according to the disclosed embodiments. As indicia of user-browser interactions is gathered, the browser 112 may generate user-browser interaction data based on the indicia at element 504 and transmit the generated user-browser interaction data to a specified incoming interaction server 108 at element 506. The network location of the incoming interaction server 108 may be specified in the JavaScript (or other script) executing on browser 112. The ability to specify particular incoming interaction servers 108 facilitates the use of multiple incoming interaction servers 108 in a single e-commerce fraud detection system 100.

The incoming interaction server 108 may receive user-browser interaction data from one or more client computer systems 102 at element 508. Via the interaction data manager 114, the incoming interaction server 108 may associate received user-browser interaction data with a particular user login at element 510. Indications of the user login may be stored in the user-browser interaction data or received separately. At element 512, the interaction database interface 304 of the incoming interaction server 108 may store user-browser interaction data and any associated information in the user-browser interaction database 130, after which the method terminates. Associated information may include, for example, an indication of the user login, user-browser interaction profile, or other identification information.

Figure 6:
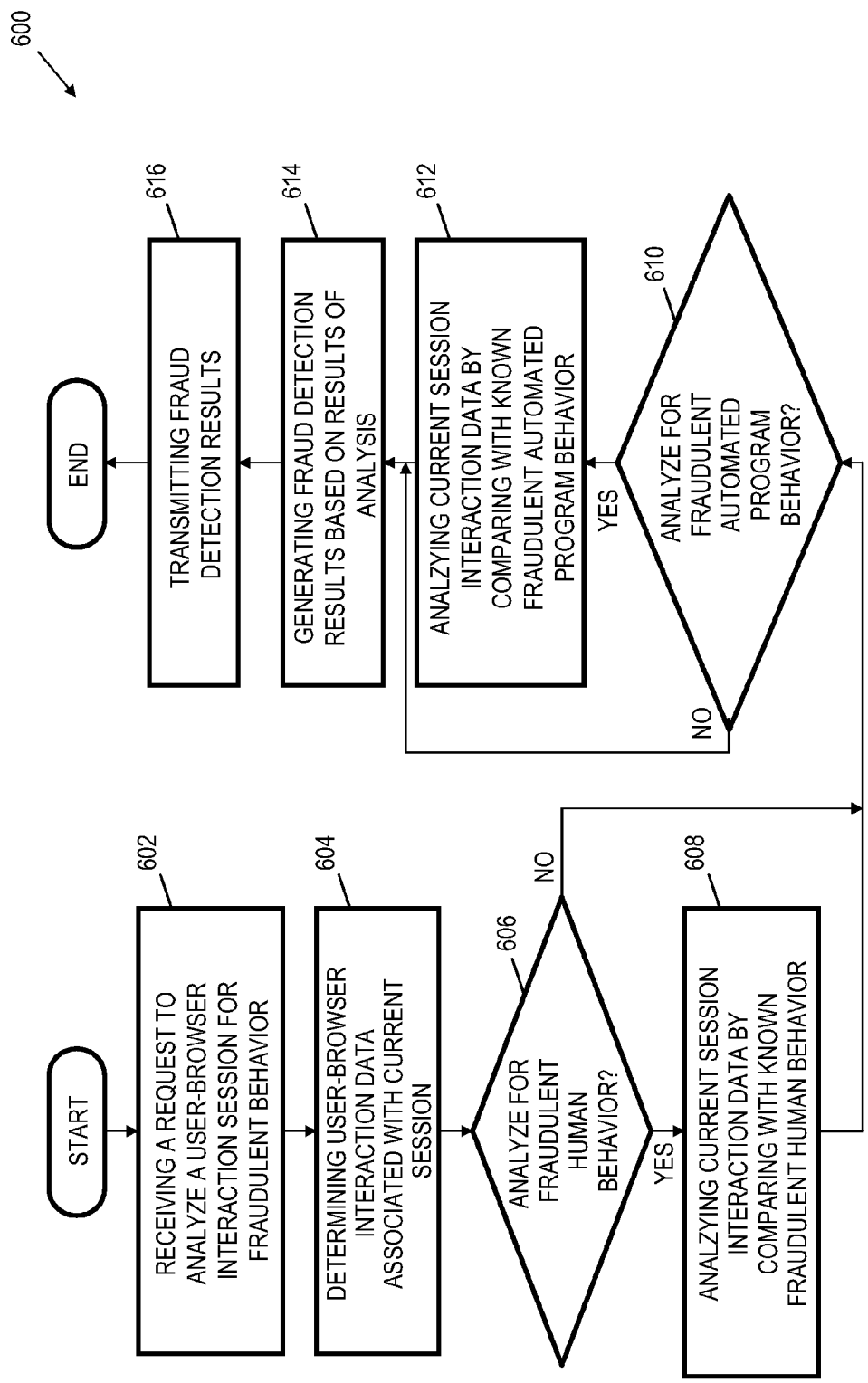
FIG. 6 depicts an example of a flow chart for receiving a request to analyze a user-browser interaction session for fraudulent behavior and to provide fraud detection results according to one embodiment.

FIG. 6 depicts an example of a flow chart 600 for receiving a request to analyze a user-browser interaction session for fraudulent behavior and to provide fraud detection results according to one embodiment. The method of flow chart 600 may be performed, in one embodiment, by components of the fraud detection server 110. Flow chart 600 begins with element 602, where the fraud detection server 110 may receive a request from an e-commerce application 118 to analyze a particular user-browser interaction session for fraudulent behavior. The fraud detection server 110 may, at element 604, determine the user-browser interaction data associated with the current session for which the request was made. In some embodiments, the user-browser interaction data for the current session may be stored in the user-browser interaction database 130, while in other alternative embodiments the user-browser interaction data for the current session may be received from the e-commerce application 118 along with the request.

At decision block 606, the fraud detection server 110 may determine whether the e-commerce session should be analyzed for fraudulent human behavior. If analysis for fraudulent human behavior is desired, the method of flow chart 600 continues to element 608, where the fraud detection module 116 and its human fraud detector 408 may analyze the current session interaction data by comparing the data with known fraudulent human behavior, such as the factors described in relation to FIG. 4. Similarly, at decision block 610, the fraud detection server 110 may determine whether the e-commerce session should be analyzed for fraudulent automated program behavior. If analysis for fraudulent automated program behavior is desired, the method of flow chart 600 continues to element 612, where the fraud detection module 116 and its automated program fraud detector 410 may analyze the current session interaction data by comparing the data with known fraudulent automated program behavior, such as the factors described in relation to FIG. 4. As described previously, the fraud detection module 116 may analyze the user-browser interaction data by comparison to either or both of human and automated program fraudulent behavior.

After analysis and comparison of the user-browser interaction data with respect to known fraudulent behavior, the fraud detection module 116 and its fraud analyzer 406 may determine fraud detection results based on the results of the analysis at elements 608 and/or 612. The application server interface 402 of the fraud detection server 110 may then transmit the fraud detection results to the requesting e-commerce application 118 at element 616, after which the method terminates. By utilizing the method of FIG. 6, the fraud detection server 110 may thus provide fraud detection results to requesting e-commerce applications 118 for users (or purported users) currently accessing those e-commerce applications 118 from their specific client computer systems 102.

Figure 7:
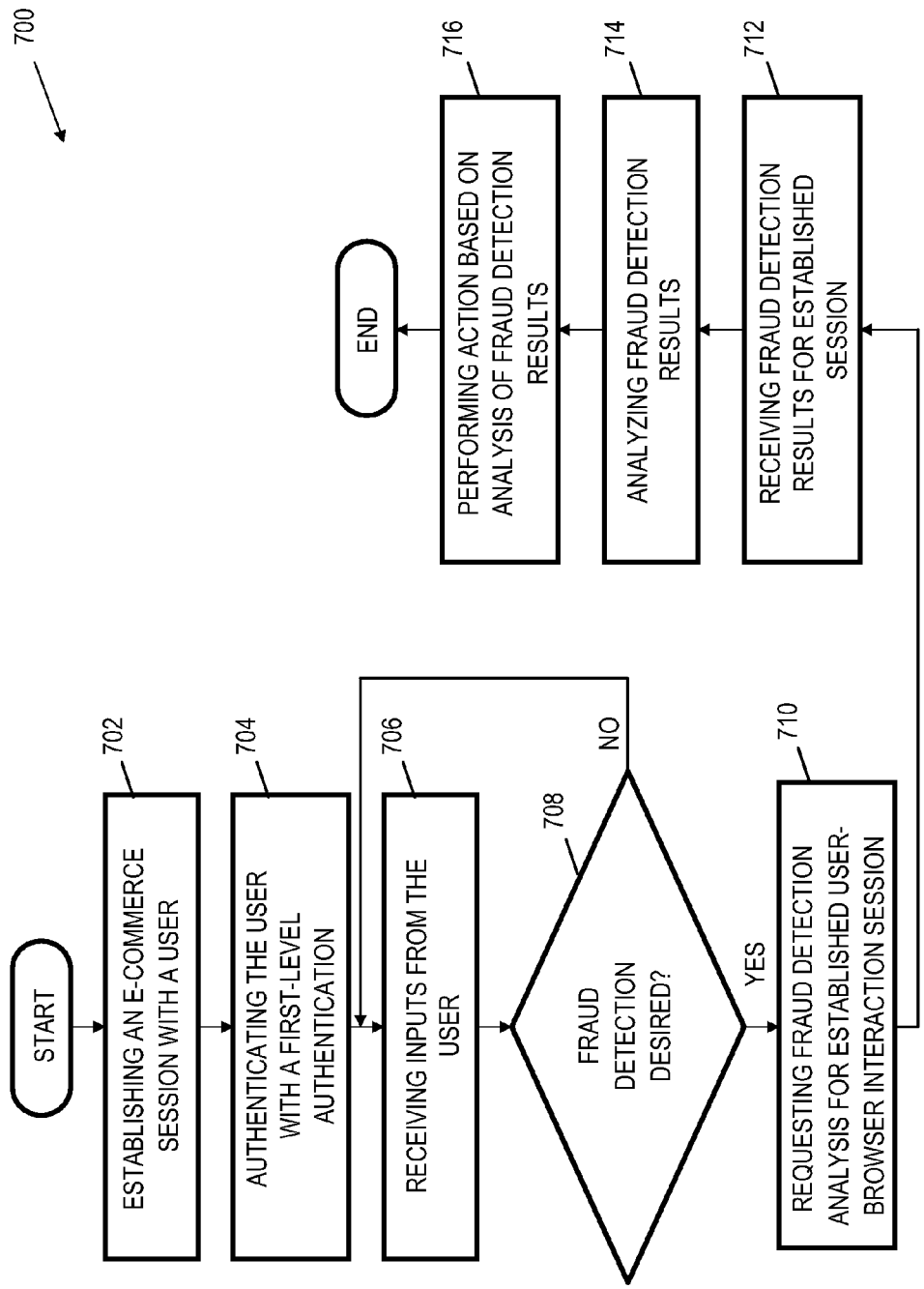
FIG. 7 depicts an example of a flow chart for interacting with a user and determining if the user is engaging in fraudulent behavior during an e-commerce session according to one embodiment.

FIG. 7 depicts an example of a flow chart 700 for interacting with a user and determining if the user is engaging in fraudulent behavior during an e-commerce session according to one embodiment. The method of flow chart 700 may be performed in some embodiments by an e-commerce application 118 executing on, for example, an application server 106. Flow chart 700 begins with element 702, where the e-commerce application 118 establishes an e-commerce session with a user. Establishment of a session may typically include authenticating the user with a first-level authentication at element 704. A first-level authentication may be authentication such as a user name and password or any other type of authentication. Alternatively, no first-level authentication is performed (eliminating the need for element 704) and establishment of a user session may require only a user name or other identification.

Once a session is established, the e-commerce application 118 may receive inputs from the user at element 706 as part of the normal operation of the e-commerce site. User inputs may include particular actions (e.g., checkout or purchase, request for information, filling out and submission of forms, etc.). The e-commerce application 118 may determine at decision block 708 whether fraud detection (beyond any first-level authentication) is desired. The e-commerce application 118 may make such determination automatically for every user, upon receiving a request for a particular action (e.g., checkout of an e-commerce site), or at any other time. If fraud detection is not required, the method of flow chart 700 returns to element 706 to receive more user inputs. If the e-commerce application 118 determines that fraud detection is required, the fraud detection requester 120 may at element 710 request analysis of the established user-browser interaction session (i.e., request fraud detection results for the current established session) from the fraud detection server 110. The fraud detection requester 120 may make such request in response to a request by the e-commerce application 118 itself or based on its own determination. The request for analysis may include an indication of the user (such as a user login) and may optionally include an indication of the user's interaction with the browser 112 during the current session.

After requesting analysis of user-browser interaction for the session for fraudulent behavior, the e-commerce application 118 may receive fraud detection results for the established session at element 712. The e-commerce application 118 may then, at element 714, analyze the fraud detection results to determine an appropriate course of action with respect to the user and may perform such action based on the analysis of the fraud detection results at element 716, after which the method terminates. The e-commerce application 118 may determine a course of action based on whatever action might have been requested by the user and the analysis of the fraud detection results. The action of the e-commerce application 118 may be allowing or deny all or part of requested operations, allowing a transaction to complete, denying a transaction, providing restricted information, modifying user information, changing a password for the user, providing additional information, marking the transaction for later follow-up, flagging the transaction as one that cannot complete until independent phone verification occurs, etc. For example, if the analysis of the fraud detection results indicates that fraud is highly unlikely for the particular e-commerce session, the e-commerce application 118 may progress in the established session with the user as it normally would. On the other hand, fraud detection results that indicate a high possibility of fraud may cause the e-commerce application 118 to terminate the session or reject any requested actions by the user. A fraud detection result that indicates a possibility of fraud, in another example, may result in the e-commerce application 118 requesting additional authentication from the user or limiting the actions that the user may perform.

It will be apparent to those skilled in the art having the benefit of this disclosure that the present invention contemplates methods, systems, and media for detecting fraudulent behavior during an e-commerce (Internet commerce) session. It is understood that the form of the invention shown and described in the detailed description and the drawings are to be taken merely as examples. It is intended that the following claims be interpreted broadly to embrace all the variations of the example embodiments disclosed.

What is claimed is:

1. A method for detecting fraudulent behavior during an Internet commerce session, the method comprising:

establishing, by an application server computer system, an e-commerce session with a particular user;

requesting, by the application server computer system, fraud detection analysis of user-browser interaction during the e-commerce session;

determining, by the application server computer system, user-browser interaction data associated with the established e-commerce session with the particular user, the user-browser interaction data comprising indications of each of keyboard interactions, movement device interactions, and navigation/selection tendencies;

accessing, by a fraud detection computer system, stored user-browser interaction data for the particular user associated with previous e-commerce sessions by the particular user, the stored user-browser interaction data comprising indications of each of keyboard interactions, movement device interactions, and navigation/selection tendencies;

comparing, by the fraud detection computer system, the determined user-browser interaction data to both known fraudulent automated program behavior and to the accessed stored user-browser interaction data from previous e-commerce sessions by the particular user;

determining, by the fraud detection computer system, fraud detection results for the established e-commerce session based on the comparison of the determined user-browser interaction data with the known fraudulent automated program behavior and the stored user-browser interaction data from previous e-commerce sessions by the particular user;

transmitting, by the fraud detection computer system, the fraud detection results to the application server computer system; and performing, by the application server computer system an action based on the fraud detection results.

2. A non-transitory machine-accessible medium of a non-transitory storage device, said non-transitory machine-accessible medium containing instructions effective, when executing in a data processing system, to cause said data processing system to perform operations comprising:

establishing, by an application server computer system, an e-commerce session with a particular user;

requesting, by the application server computer system, fraud detection analysis of user-browser interaction during the e-commerce session;

determining, by the application server computer system, user-browser interaction data associated with the established e-commerce session with the particular user, the user-browser interaction data comprising indications of each of keyboard interactions, movement device interactions, and navigation/selection tendencies;

accessing, by a fraud detection computer system, stored user-browser interaction data for the particular user associated with previous e-commerce sessions by the particular user, the stored user-browser interaction data comprising indications of each of keyboard interactions, movement device interactions, and navigation/selection tendencies;

comparing, by the fraud detection computer system, the determined user-browser interaction data to both known fraudulent automated program behavior and to the accessed stored user-browser interaction data from previous e-commerce sessions by the particular user;

determining, by the fraud detection computer system, fraud detection results for the established e-commerce session based on the comparison of the determined user-browser interaction data with the known fraudulent automated program behavior and the stored user-browser interaction data from previous e-commerce sessions by the particular user;

transmitting, by the fraud detection computer system, the fraud detection results to the application server computer system; and performing, by the application server computer system an action based on the fraud detection results.

3. An e-commerce fraud detection system, the system comprising:

an application server computer system having one or more processors and in communication with an incoming interaction server and a fraud detection server computer system, the application server comprising:

an e-commerce application to establish a session with a particular user of a client computer system;

a fraud detection requester in communication with the e-commerce application to request fraud detection analysis of user-browser interaction for the established session and to receive fraud detection results for the established session; and wherein the e-commerce application is adapted to perform an action based on the fraud detection results for the established session; and a fraud detection server computer system having one or more processors and in communication with the application server computer system, the fraud detection server comprising:

an application server interface to receive from the application server computer system a request for fraud detection analysis of user-browser interaction for the established session with the particular user and to transmit fraud detection results to the application server computer system;

an interaction database interface to access stored user-browser interaction data associated with previous e-commerce sessions by the particular user, the stored user-browser interaction data comprising indications of each of keyboard interactions, movement device interactions, and navigation/selection tendencies;

a fraud detection module to determine user-browser interaction data associated with the established e-commerce session with the particular user, the user-browser interaction data comprising indications of each of keyboard interactions, movement device interactions, and navigation/selection tendencies; and wherein the fraud detection module determines fraud detection results for the established e-commerce session based on a comparison of determined user-browser interaction data with both known fraudulent automated program behavior and the accessed stored user-browser interaction data from previous e-commerce sessions by the particular user.

* * * * *